June 3, 1958     P. G. KASTER     2,837,228
WAGON UNLOADER

Filed Sept. 12, 1955     2 Sheets-Sheet 1

FIG.-1

INVENTOR
Paul G. Kaster
By Herbert A. Newbury
ATTORNEY

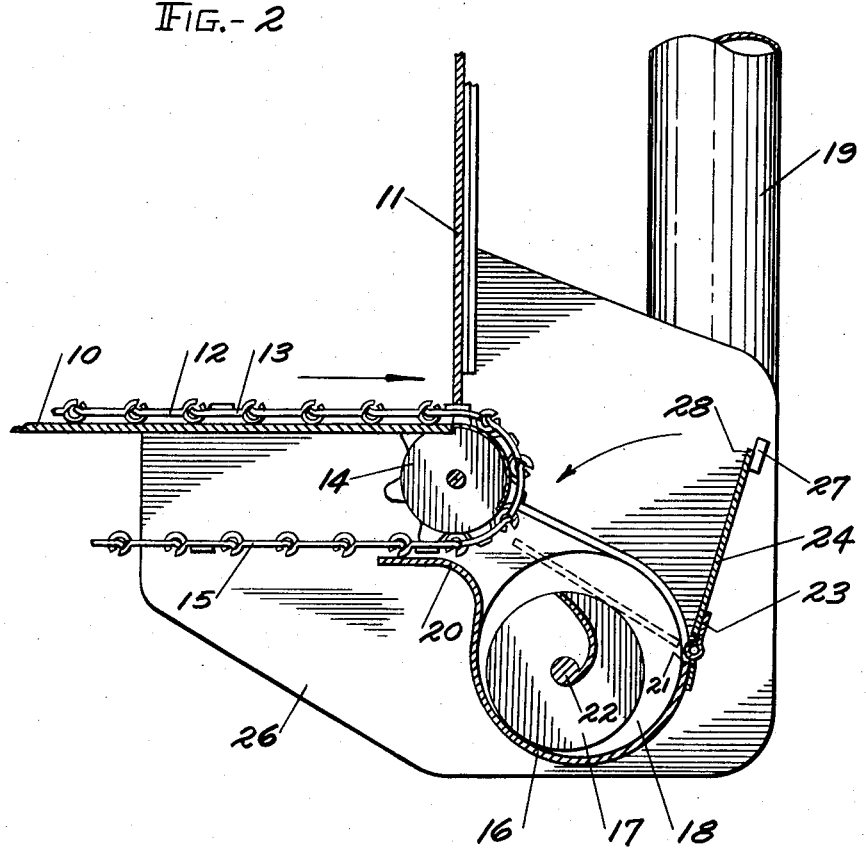

United States Patent Office 2,837,228
Patented June 3, 1958

2,837,228

WAGON UNLOADER

Paul G. Kaster, Shelby County, near Shelbyville, Ind.

Application September 12, 1955, Serial No. 533,703

2 Claims. (Cl. 214—83.18)

This invention relates to a construction for selectively unloading materials of varying sizes such as corn in ear form or wheat. The invention particularly relates to a construction whereby the coarser materials such as ear corn may be unloaded from a wagon and dumped into a separate conveyer as an example, or wheat may be unloaded from the wagon, and dropped into a conveyer carried by the wagon to be elevated by a conveyer carried by the wagon.

While the invention has been referred to as relating to unloading grains, it is as well adapted to unloading other materials.

A primary advantage of the invention resides in the fact that no externally applied members are required and that the entire apparatus may be conveniently incorporated in the wagon structure itself.

A further important advantage of the invention resides in the fact that the construction may be made at a relatively low cost and may occupy very little additional space over and above the usual conveying apparatus.

These and many other objects and advantages of the invention will become apparent to those versed in the art in the following description of one particular form of the invention as illustrated in the accompanying drawings in which Fig. 1 is a fragmentary view inside elevation of a wagon structure to which the invention is applied; and Fig. 2 is a view in vertical section on the line 2—2 in Fig. 1. While reference above has been made to the application of the invention to a wagon, the invention is equally well adapted to be used on any type of a receptacle wherein there is a drag chain employed for unloading that receptacle, such receptacles being ordinary bins or cribs, wagons, or even railroad cars.

Using as the present example, the wagon, and referring to the drawings, the wagon has a floor 10 and a side gate 11 which may be raised in order to permit the contents of the wagon to flow therethrough. Over the floor there is provided a drag chain generally designated by the numeral 12, having upper flight 13 which drags over the floor 10 to be carried around a driving sprocket 14 and thence carried by an under flight 15 below the floor 10. This much of the structure has heretofore been employed and does not constitute a part of the invention per se.

There is mounted below the chain flight 15 a compartment housing generally semi-cylindrical in shape and designated by the numeral 16 to extend transversely of the drag chain 12.

An auger 17 of the type commonly employed to convey materials in loose form is mounted to be revolubly carried longitudinally of the housing 16. The auger 17 is driven in that direction which will deliver materials to the right hand sides of the housing 16 as viewed in Fig. 1. The delivery of the auger 17 is through the opening 18, Fig. 2. This opening 18 permits materials carried across the housing 16 to discharge into the vertically disposed conveyer 19 mounted at the side of the wagon and is of the usual and conventional type so that material may be vertically elevated, or the conveyer 19 rocked at an angle away from the wagon, all in the well known and usual manner.

The wall of the housing 16 is carried around and upwardly by an apron 20 immediately below the sprocket 14 and for a short distance along the under side of the chain flight 15. The housing 16 terminates by an outer, upper edge 21 horizontally disposed at a slight distance above the level of the shaft 22 on which the auger 17 is mounted.

A hinge generally designated by the numeral 23 is secured along this edge 21, and also engages a door 24. This door 24 is free to rock between the end plates 25 and 26, one at each end of the housing 16. The door in the position indicated in the drawings is in its outward position leaning against stops 27, one on each of the plates 25 and 26.

In this outermost position of the door 24, material being carried out of the wagon by the top chain flight 13 when the wagon gate 11 is raised upwardly will discharge freely downwardly onto the auger 17 and thus be conveyed laterally to the vertical conveyer 19. This operation will be entirely feasible for grain such as oats and wheat and the like, but the auger 17 does not lend itself to handling ear corn.

To handle ear corn, the door 24 would be rocked in the direction of the arrow, Fig. 2, to come to some such position as indicated by the dash lines where it would be resting on the auger 17, and the outer edge 28 of the door 24 would be under the chain 12 where it is carried around the sprockets 14 so that corn dropping from the chain flight 13 will strike on the door 24 and slide thereoff to drop downwardly therefrom. Normally there would be a portable conveyer receiving the corn, which conveyer does not enter into the invention.

When the material is to be discharged from the wagon or receptacle, that wagon or receptacle would be standing still, and hence no particular latch or holding device is required to retain the door 24 in either one of the selected positions, the solid line position or the dash line position as indicated in Fig. 2.

The chain 12, auger 17, and conveyer 19 may be simultaneously driven by any suitable means, herein shown as by a chain 29.

Therefore it is to be seen that I have provided an exceedingly simple device for the purposes intended, and while I have described the construction in more or less detail, it is obvious that structural changes may be employed without departing from the spirit of the invention, and I therefore do not desire to be limited to that precise form beyond the limitations which may be imposed by the following claims.

I claim:

1. An unloading delivery device for mounting at a discharge opening of a receptacle through which opening materials may flow, the combination of a pair of spaced apart, approximately vertically disposed end members; an open top, generally U-shaped housing secured by ends to said members and approximately horizontally disposed therebetween; one of said members having a discharge opening therethrough; an auger rotatably carried in and lengthwise of said housing between said members with a discharge end portion at said member opening; said housing having a first wall portion on one side extending along and above said auger; said housing having a second wall portion terminating on a horizontal longitudinal line between said members; a door hinged along said second wall line and extending in one rocked position inclined from the hinge line over and covering said auger, and in a second rocked position away from and uncovering the auger as an upward continuation of second wall portion; said door swinging between said members; and stop means carried by said members limiting swing of the door to said second position; and means mounting said device on said receptacle; said mounting means locating the upper edge of said first wall portion under said opening, the second wall portion being spaced from and locating said auger across and below said opening exposed by its full length thereunder to receive materials thereacross and thereon falling from said opening; and said door terminating in a line under said opening when in said inclined position setting up a chute floor over the auger and between said members inclined downwardly and away from the opening; and said door upon being in said second position forming a splash guard on the side of the auger removed from said opening.

2. The structure of claim 1 in which said second wall portion hinge line is at an elevation below the top side of said auger; said door resting on the auger as a stop when in its said inclined position.

References Cited in the file of this patent

UNITED STATES PATENTS

| | | |
|---|---|---|
| 688,806 | Young | Dec. 10, 1901 |
| 931,054 | Gardner | Aug. 17, 1909 |
| 2,466,923 | Woodard | Apr. 12, 1949 |
| 2,743,832 | Kappelmann | May 1, 1956 |
| 2,771,203 | Collins et al. | Nov. 20, 1956 |